United States Patent
Chopra et al.

(10) Patent No.: US 10,936,430 B2
(45) Date of Patent: Mar. 2, 2021

(54) METHOD AND SYSTEM FOR AUTOMATION OF DIFFERENTIAL BACKUPS

(71) Applicant: EMC IP Holding Company LLC, Hopkinton, MA (US)

(72) Inventors: Shelesh Chopra, Bangalore (IN); Asif Khan, Bangalore (IN); Krishnendu Bagchi, Bangalore (IN); Matthew Dickey Buchman, Seattle, WA (US); Pallavi Prakash, Bangalore (IN); Vipin Kumar Kaushal, Bangalore (IN); Nitin Anand, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 153 days.

(21) Appl. No.: 16/256,648

(22) Filed: Jan. 24, 2019

(65) Prior Publication Data

US 2020/0241966 A1 Jul. 30, 2020

(51) Int. Cl.
*G06F 11/14* (2006.01)
*G06F 16/23* (2019.01)

(52) U.S. Cl.
CPC ...... *G06F 11/1451* (2013.01); *G06F 11/1458* (2013.01); *G06F 11/1471* (2013.01); *G06F 16/2358* (2019.01); *G06F 2201/80* (2013.01); *G06F 2201/835* (2013.01); *G06F 2201/84* (2013.01)

(58) Field of Classification Search
CPC ........... G06F 2201/835; G06F 2201/80; G06F 11/1451; G06F 11/1471; G06F 11/1458; G06F 16/2358; G06F 2201/84
USPC ......................................................... 707/646
See application file for complete search history.

(56) References Cited

U.S. PATENT DOCUMENTS

2012/0078855 A1* 3/2012 Beatty ................. G06F 11/1469
707/676

OTHER PUBLICATIONS

Oracle® Database Backup and Recovery Advanced User's Guide, 10g Release 2 (10.2), Aug. 2008, Primary Author: Antonio Romero (Year: 2008).*

* cited by examiner

*Primary Examiner* — Kuen S Lu
(74) *Attorney, Agent, or Firm* — Chamberlain, Hrdlicka, White, Williams & Aughtry (57) ABSTRACT

A method for managing backups that includes generating a full backup of a database and, after generating the full backup, generating N incremental backups of the database and generating a first differential backup of the database after the N incremental backups have been generated, wherein the first differential backup is generated relative to the full backup.

8 Claims, 6 Drawing Sheets

METHOD AND SYSTEM FOR AUTOMATION OF DIFFERENTIAL BACKUPS

BACKGROUND

Computing devices may include any number of internal components such as processors, memory, and persistent storage. Each of the internal components of a computing device may be used to generate data. The process of generating, storing, backing-up, and recovering data may utilize computing resources of the computing devices such as processing and storage. The utilization of the aforementioned computing resources to generate and/or recover backups may impact the overall performance of the computing resources.

SUMMARY

In general, in one aspect, the invention relates to a method for managing backups in accordance with one or more embodiments of the invention. The method includes generating a full backup of a database and, after generating the full backup, generating N incremental backups of the database and generating a first differential backup of the database after the N incremental backups have been generated, wherein the first differential backup is generated relative to the full backup.

In one aspect, a system in accordance with one or more embodiments of the invention includes a processor, a database, and memory comprising instructions which, when executed by the processor perform a method. The method includes generating a full backup of a database, and, after generating the full backup, generating N incremental backups of the database and generating a first differential backup of the database after the N incremental backups have been generated, wherein the first differential backup is generated relative to the full backup.

In one aspect, a non-transitory computer readable medium in accordance with one or more embodiments of the invention includes computer readable program code, which when executed by a computer processor enables the computer processor to perform a method for managing backups. The method includes generating a full backup of a database and, after generating the full backup, generating N incremental backups of the database, and generating a first differential backup of the database after the N incremental backups have been generated, wherein the first differential backup is generated relative to the full backup.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for storing and/or recovering backup data in a remote (e.g., cloud) storage device. More specifically, embodiments of the invention provide a method for generating backups of a database at various points in time. The backups may be full backups that are independent of other backups, differential backups that depend on a previous full backup, or incremental backups that depend on any previous backup of the database. Embodiments of the invention further provide a method for recovering the database using the generated backups. Embodiments of the invention may determine which backups to use and what types of backups may be needed to efficiently perform a recovery of the backup.

Figure 1:
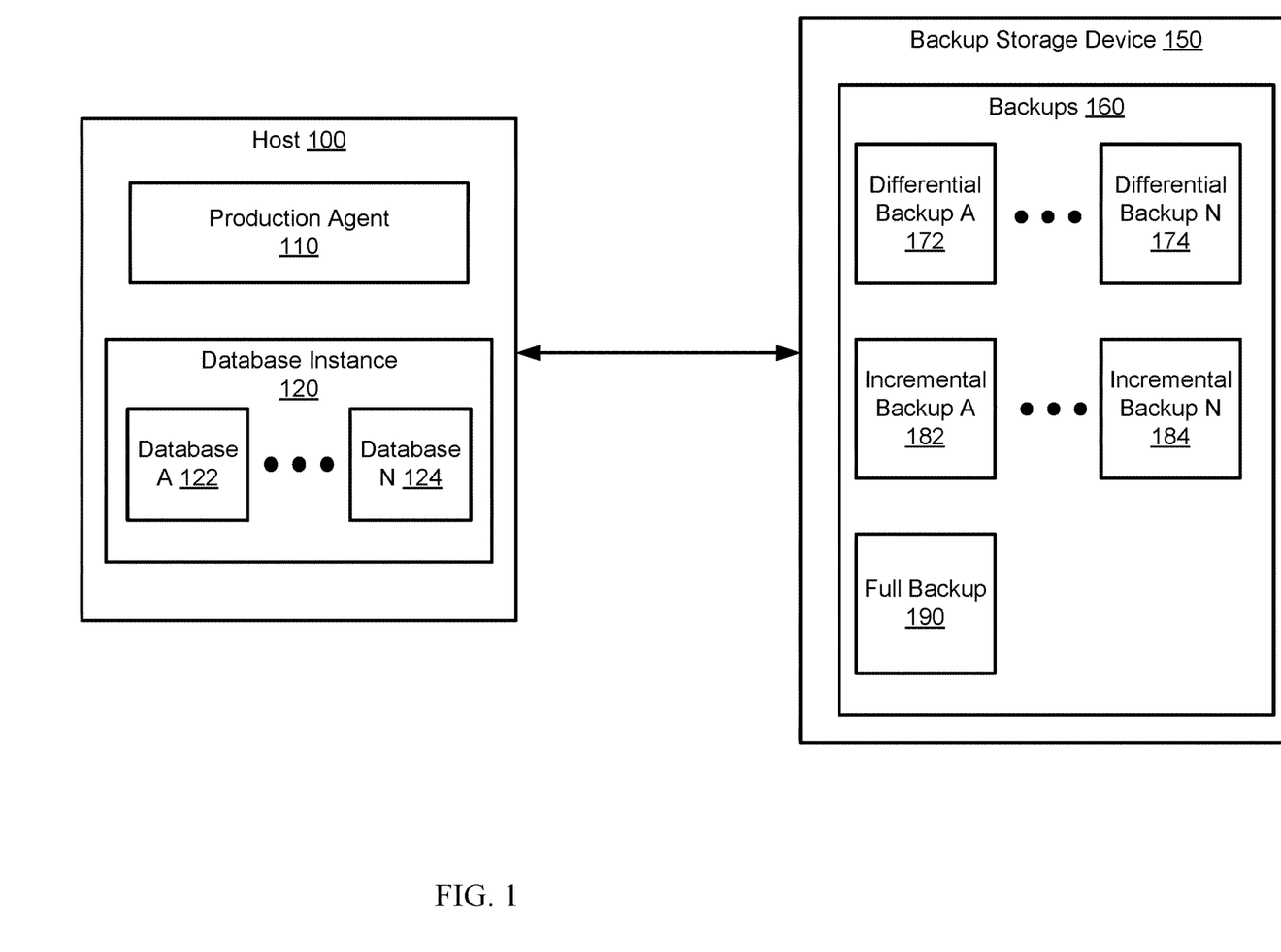
FIG. 1 shows a diagram of a system in accordance with one or more embodiments of the invention.

FIG. 1 shows a system in accordance with one or more embodiments of the invention. The system includes a host (100) and a backup storage device (150). Each component of the system of FIG. 1 may be operably connected via any combination of wired and/or wireless connections. Each component of the system is discussed below.

In one or more embodiments of the invention, the host (100) includes a database instance (120). The database instance (120) is a grouping of databases (e.g., 122, 124).

The host (100) may generate and store backups of the databases (122, 124) in the backup storage device (150).

In one or more embodiments of the invention, the host includes a production agent (110) that includes functionality for generating backups of databases in the database instance (120) and/or recovering the database instance (120) to a previous point in time. The production agent (110) may generate backups of the database instance (120) and send the backup to the backup storage device (150). The production agent may utilize backup policies to determine: (i) when to generate a backup and (ii) what type of backup to generate (discussed below in, e.g., FIG. 2A). Additionally, the production agent (110) may obtain backups (e.g., 160) from the backup storage device (150) when recovering the database instance (120) (see e.g., FIG. 2B for additional details regarding recovering a database instance). In one or more embodiments of the invention, the production agent (110) includes functionality to perform the methods shown in FIGS. 2A-2B.

In one or more of embodiments of the invention, the production agent (110) is implemented as computer instructions, e.g., computer code, stored on a persistent storage that when executed by a processor of the host (100) cause the production agent (110) to provide the aforementioned functionality of the production agent (110).

Figure 4:
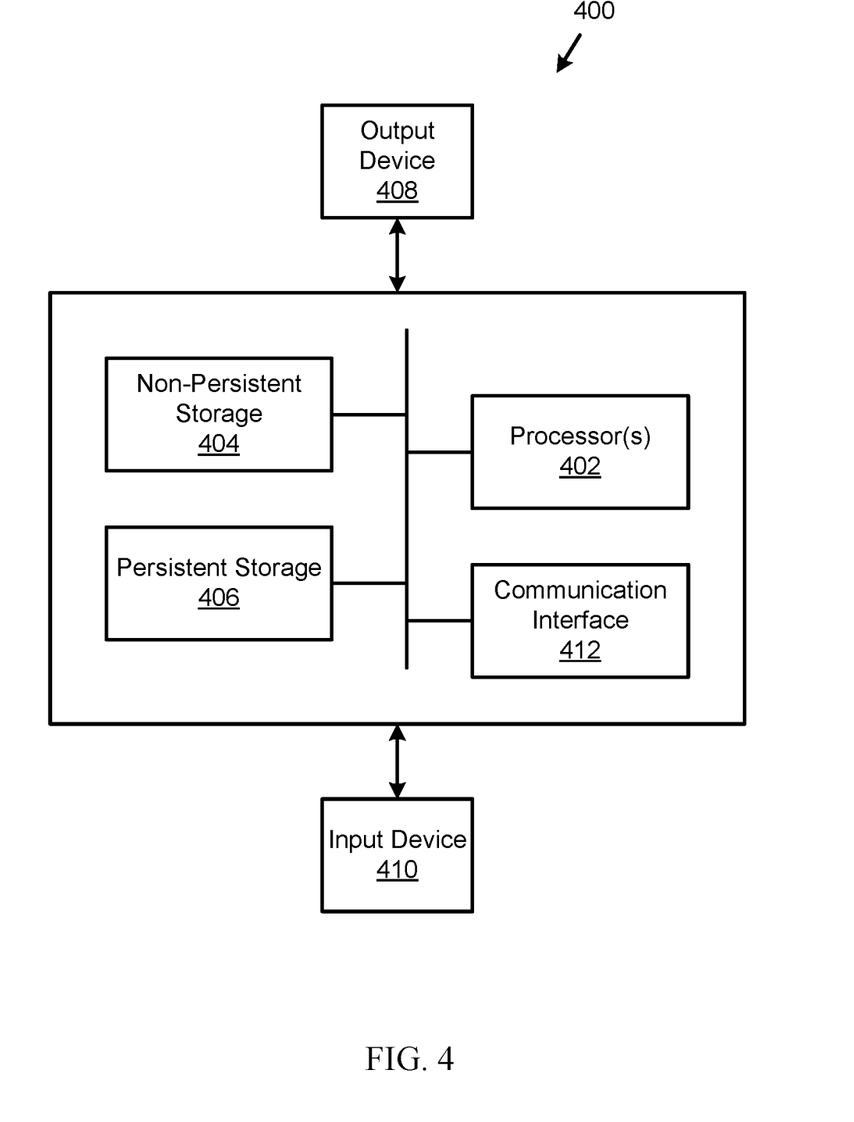
FIG. 4 shows a diagram of a computing device in accordance with one or more embodiments of the invention.

In one or more embodiments of the invention, the host (100) is a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application and/or all, or a portion thereof, of the methods illustrated in FIGS. 2A-2B.

In one or more embodiments of the invention, the host (100) is implemented as a logical device. The logical device may utilize the computing resources of any number of computing devices and thereby provide the functionality of the host (100) described throughout this application and/or all, or a portion thereof, of the methods illustrated in FIGS. 2A-2B.

In one or more embodiments of the invention, the backup storage device (150) includes backups (160) of the database instance (120). The backups may be data structures, stored in persistent storage, that include data used to recover a database instance (120) to a previous state. The backups (160) may be of different types (e.g., full, differential, and/or incremental). Each of the aforementioned types of backups is described below.

In one or more embodiments of the invention, a full backup (e.g., 190) is a backup of a database that includes sufficient data required to independently recover the database (i.e., no other backups are required) to a predetermined point in time. The full backup (190) may include a timestamp that specifies the predetermined point in time. To recover the database to the point in time specified by the full backup (190), the production agent (110) obtains the full backup (190) and may not need any additional backups (e.g., 172, 174, 182, 184).

In one or more embodiments of the invention, a differential backup (e.g., 172, 174) is a backup of a database that includes changes to the database during a period of time between the timestamp of the full backup and a later point in time. Each differential backup (172, 174) may include a timestamp specifying the corresponding later point in time. To recover the database to the point in time specified by a differential backup (e.g., 174), the production agent (110) obtains the full backup (e.g., 190) associated with the differential backup (e.g., 174) along with the differential backup (174). In other words, the database may not be recovered using only the differential backup (174); the production agent may require the use of both the full backup (e.g., 190) and the differential backup (e.g., 174).

In one or more embodiments of the invention, an incremental backup (e.g., 182, 184) is a backup of a database that includes changes to the data since a last backup of the database was performed. The last backup may be a full backup, a differential backup, and/or another incremental backup. An incremental backup (e.g., 182, 184) may be a log of transactions (e.g., data written to the database) that occur during a period of time after the previous most recent backup (which may be a full backup or a differential backup) was generated. The incremental backup may also be referred to as a transactional log backup.

To clarify differences between a differential backup and an incremental backup, a differential backup tracks changes since the last full backup (i.e., a previous, most recent full backup) while, in contrast, an incremental backup may track changes since the last backup of any type.

To trigger a backup generation, the production agent may follow backup policies. The backup policies may specify when to generate a backup as well as what type of backup to generate. The backup policies may include a schedule. For example, full backups may be scheduled to be generated every 24 hours, every 7 days, etc. Incremental backups may be scheduled to be generated every 15 minutes, every hour, etc.

Further, backup policies may specify for backups to be generated after a number of backups have been generated. For example, a backup policy may trigger a generation of a differential backup after every five incremental backups have been generated. The number of incremental backups that trigger a generation of a differential backup may be determined by an administrator (i.e., a user) using the host or a separate computing device (i.e., a client) sending a request to the host to update the backup policies. Other methods such a machine learning or heuristics may be used to determine when to trigger any of the aforementioned types of backups without departing from the invention.

In one or more embodiments of the invention, the backup storage device (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage device (150) described throughout this application.

In one or more embodiments of the invention, the backup storage device (150) is implemented as a logical device. The logical device may utilize the computing resources of any number of computing devices and thereby provide the functionality of the backup storage device (150) described throughout this application.

Figure 2A:
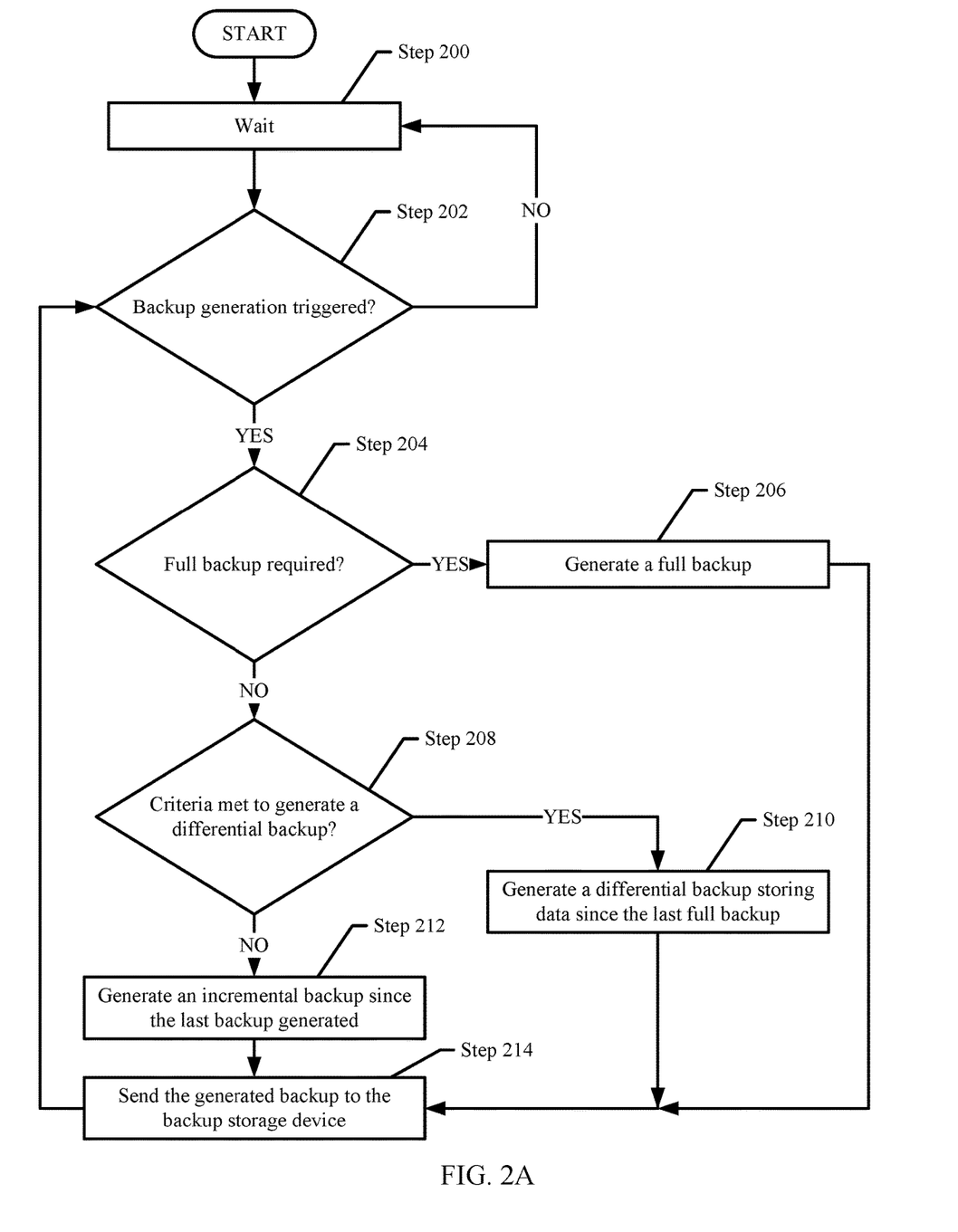
FIG. 2A shows a flowchart for managing backups of a database instance in accordance with one or more embodiments of the invention.
Figure 2B:
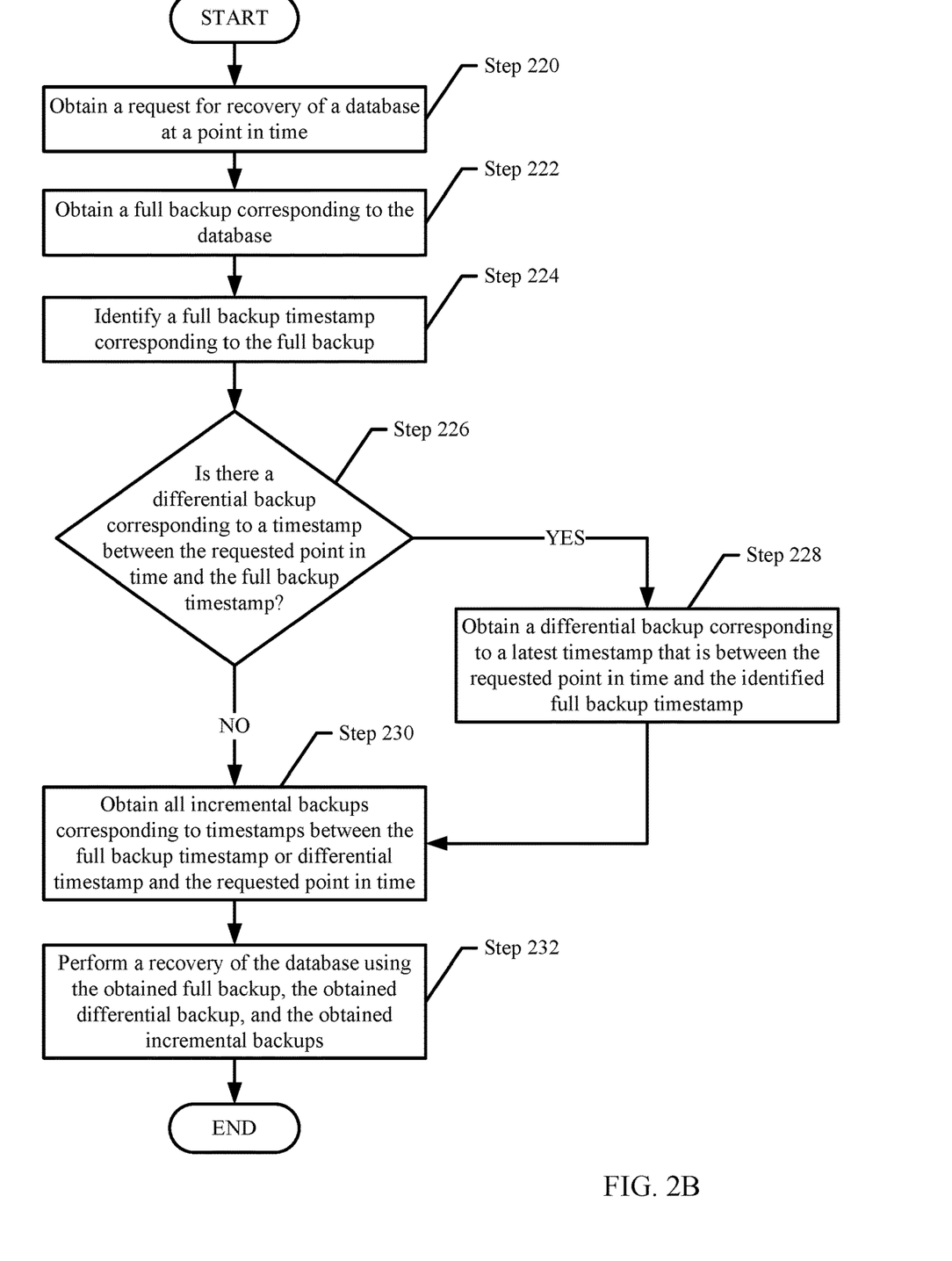
FIG. 2B shows a flowchart for performing a recovery of a database instance at a point in time in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention. The methods shown in FIG. 2A-2B may be performed by, for example, a production agent (110, FIG. 1). Other components of the system illustrated in FIG. 1 may perform the method of FIG. 2A without departing from the invention.

FIG. 2A shows a flowchart for managing backups of a database instance in accordance with one or more embodiments of the invention. In step 200, the production agent waits. The production agent may wait for the expiry of a predetermined amount of time prior to continuing to step 202. Alternatively, the production agent may wait until a backup generation is triggered (either by a user or by another process executing on the host).

In step 202, a determination is made about whether a backup generation is triggered. If a backup generation is triggered, the system proceeds to step 204; otherwise, the method proceeds to step 200.

In one or more embodiments of the invention, a backup generation is triggered by the production agent following a backup policy that specifies when a backup of a database (or database instance) is to be generated and/or what type of backup to generate. For example, a backup policy may specify that a full backup be generated every 24 hours. In this case, a backup generation may be triggered every 24 hours.

In step 204, a determination is made about whether a full backup is required. If a full backup is required, the method proceeds to step 206; otherwise, the method proceeds to step 208.

In one or more embodiments of the invention, the determination is determined based on the backup policies. If a backup has not been generated within a predetermined time period (e.g., 24 hours), the determination is made that a full backup is required.

In step 206, a full backup is generated. The full backup may be generated by taking a snapshot of the database (or database instance) and generating a copy of the data referenced in the snapshot. In one or more embodiments of the invention, a snapshot of a database is a data structure that references data segments of the database. The copy of the data referred by the snapshot may be collectively referred to as the full backup. The process then proceeds to step 214.

In step 208, a determination is made about whether criteria are met to generate a differential backup. If criteria are met to generate a differential backup, the method proceeds to step 210; otherwise, the method proceeds to step 212.

In one or more embodiments of the invention, the criteria are specified in the backup policies. For example, a backup policy may specify a criterion that, after every five incremental backups generated, the production agent is to generate a differential backup.

In step 210, a differential backup is generated by storing data that has changed since the last full backup. In one or more embodiments of the invention, the differential backup is generated by generating a snapshot of the database, identifying a snapshot generated for the last full backup (i.e., a previous, most recent full backup), identifying the differences between the two snapshots, and generating a copy of the data referenced by the differences. The copy of the aforementioned data may be collectively referred to as a differential backup. The process then proceeds to step 214.

In step 212, an incremental backup is generated storing data since the last backup. In one or more embodiments of the invention, the incremental backup is generated by generating a snapshot of the database, identifying a snapshot generated for the last backup (i.e., a previous, most recent backup), identifying the differences between the two snapshots, and generating a copy of the data referenced by the differences. The copy of the aforementioned data may be collectively referred to as an incremental backup. The process then proceeds to step 214.

In step 214, the generated backup is sent to the backup storage device. The generated backup may be the full backup (if this follows step 206), the differential backup (if this follows step 210), or an incremental backup (if this follows step 212).

The method shown in FIG. 2A may be continuously performed while the host is operating.

FIG. 2B shows a flowchart for performing a recovery of a database instance at a point in time in accordance with one or more embodiments of the invention. In step 220, a request for recovery of a database at a point in time is obtained. The request may be for a database in a database instance, or for multiple databases in the database instance. In the scenario in which the request specifies recovery for multiple databases, the method of steps 222-232 may be repeated for each database specified in the request.

In step 222, a full backup corresponding to the database is obtained. In one or more embodiments of the invention, the full backup is obtained from the backup storage device storing the full backup. The full backup may be a most recent full backup generated prior to the requested point in time associated with the database. For the recovery process of the database, the production agent may only need one full backup.

In step 224, a full backup timestamp corresponding to the full backup is identified. In one or more embodiments of the invention, the full backup timestamp is included in metadata of the full backup. The full backup timestamp may specify a point in time in which the full backup was generated.

In step 226, a determination is made about whether a differential backup of the database exists that corresponds to a timestamp between the requested point in time and the full backup timestamp; if such a differential backup exists, the method proceeds to step 228; otherwise, the method proceeds to step 230.

In step 228, a differential backup is obtained that corresponds to a latest timestamp that is between the obtained point in time and the identified full backup timestamp. In one or more embodiments of the invention, only one backup may fit the criteria of: (i) being associated with the requested database, (ii) having a timestamp that is between the full backup timestamp and requested point in time, and (iii) be the most recent differential backup of the backups that meet (i) and (ii).

In step 230, all incremental backups of the database corresponding to timestamps between the timestamp of the differential backup and the requested point in time are obtained. In one or more embodiments of the invention, any number of incremental backups may exist that fit the criteria of: (i) being associated with the requested database, and (ii)

having a timestamp that is between the either: the differential backup timestamp (if the step 230 is performed after step 228) or the full backup timestamp (if step 230 is performed directly after step 226; i.e., step 228 is not performed), and the requested point in time.

In step 232, a recovery of the database is performed using the obtained full backup, the obtained differential backup (if any), and the obtained incremental backups (if any). In one or more embodiments of the invention, the recovery is performed by recovering data of the database using the full backup, then, if present, using the differential backup to update the database to a later point in time, and finally, if present, using each subsequent obtained incremental backup to further update the database to the requested point in time.

In one or more embodiments of the invention, the process in step 232 is performed as each backup is obtained. For example, after the production agent obtains the full backup in step 222, the production agent may restore the database to a point in time associated with the full backup. The production agent may later obtain the differential backup in step 228, and update the database using the differential backup, and repeat for the incremental backups as they are obtained.

Example 1

Figure 3A:
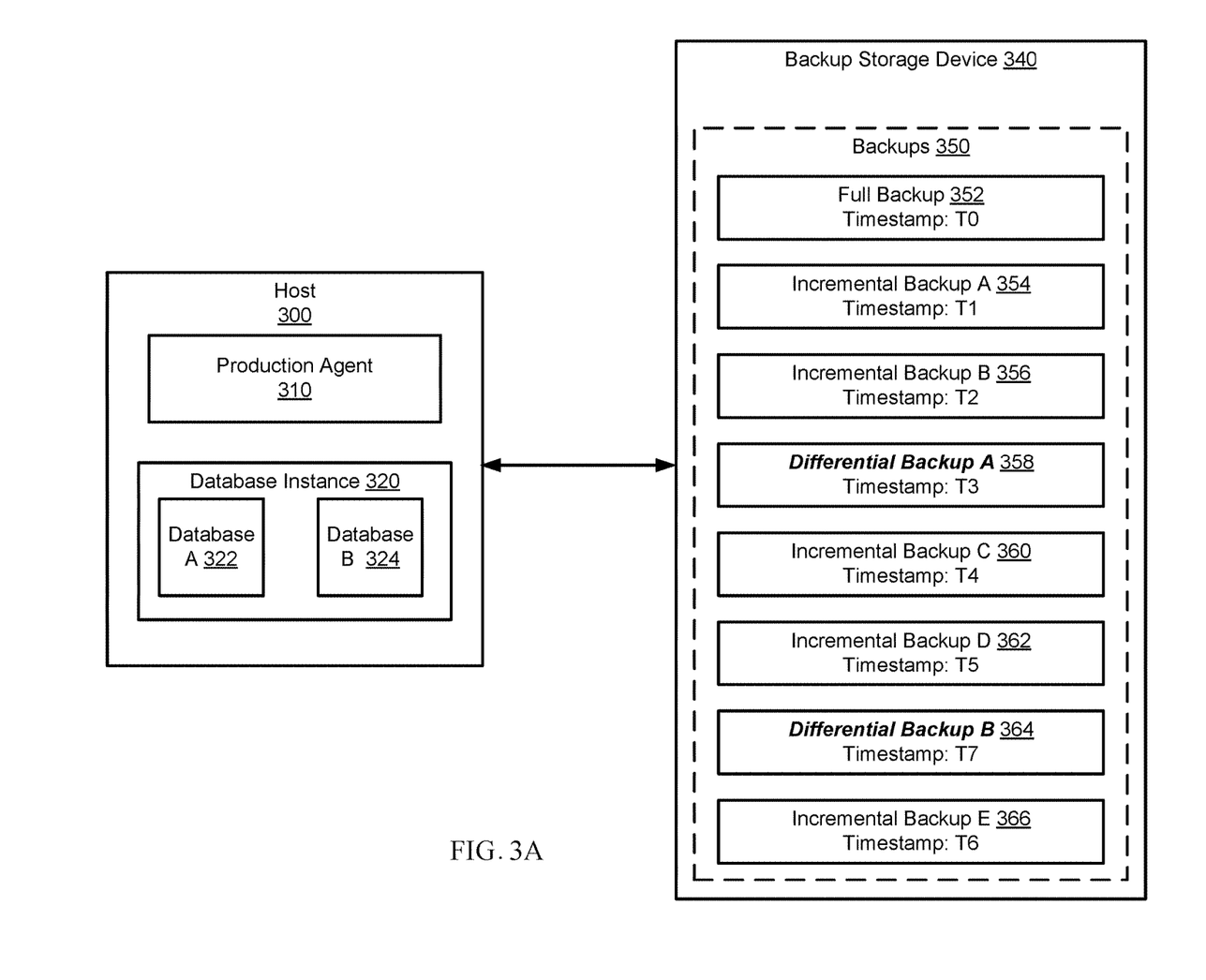
FIGS. 3A-3B show an example in accordance with one or more embodiments of the invention.

The following section describes an example. The example is not intended to limit the invention. The example may be illustrated in FIGS. 3A-3B. Turning to the example, consider a scenario in which a host (300) has requested to store backups of database A (322) of a database instance (320) at various points in time. FIG. 3A shows an example system with the host (300) using a production agent (310) to generate backups of databases A (322) and B (324). The production agent may follow backup policies (not shown) that specify a full backup (352) be generated at a time T0 and that an incremental backup (i.e., 354, 356, 360, 362, 366) be generated every 15 minutes. Further, the backup policies may specify that a differential backup (358, 364) be generated after every two incremental backups. The host may store the backups (350) of database A (322) and the backups of database B (324) in a backup storage device (340). The backups (350) of database A (322) are shown in FIG. 3A in order from the first backup generated (352) to the most recent backup (366). For the sake of brevity, the backups of database B (324) are not shown in FIG. 3A.

Figure 3B:
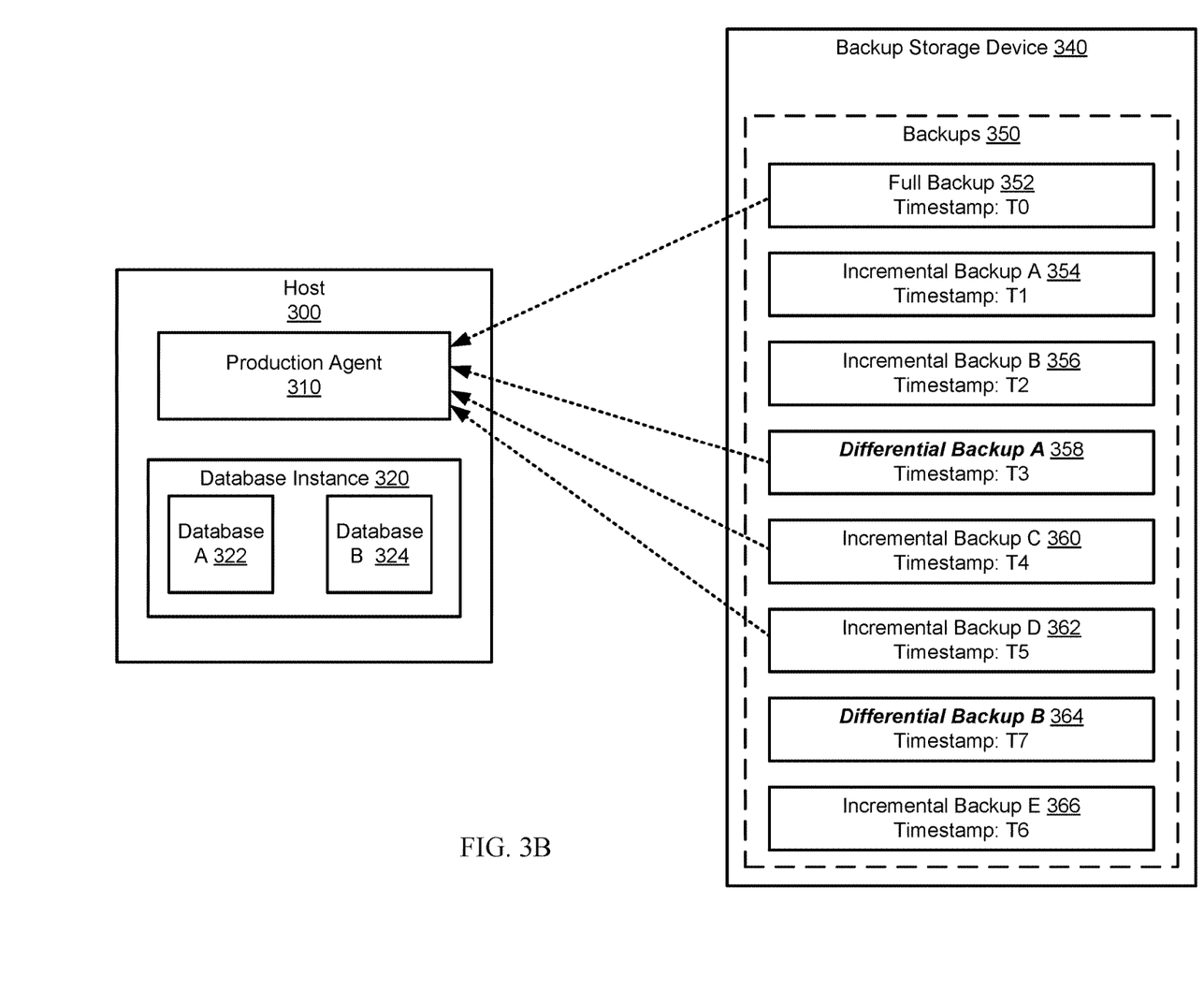

Consider a scenario in which a recovery of data in database A (322) is requested for a point in time of T5. The production agent (310) may perform the method of FIG. 2B to recover the database (322) to the requested point in time. More specifically, the production agent (310) may identify and obtain the full backup (252), and identify any differential backups with a timestamp between the requested point in time (T5) and a timestamp (T0) of the full backup (352). The production agent identifies the most recent differential backup generated during that period of time as differential backup A (358). Subsequently, differential backup A (358) is obtained because it fits this criterion. The production agent (310) then obtains all incremental backups corresponding to a timestamp that is between the timestamp (T3) of the obtained differential backup (358) and the requested point in time (T5). Incremental backups C (360) and D (362) are obtained because they fit this criterion. FIG. 3B shows the example system with dashed arrows representing the requested backups (352, 358, 360, 362) being sent to the production agent (310) to be used to recover database A (322) to a point in time T5.

End of Example 1

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention reduce the read-write operations required to perform a recovery of data by reducing the number of backups needed to be transferred between a host requesting to recover the data and a backup storage device storing the backup of the data. Embodiments of the invention introduce an automation of differential backups to a system that uses incremental backups. The differential backups may replace a large number of incremental backups that, without the differential backups, would be necessary to recover data to a previous point in time.

Example 2

The following section describes an example data that illustrates the performance improvement in the recovery of backups in accordance with one or more embodiments of the invention. The example is not intended to limit the invention.

In this example, there are two systems—an existing system (i.e., a system that does not implement embodiments of the invention) and the invention system (which implements one or more embodiments of the system). In the existing system, there is a full backup performed every 24 hours and an incremental backup performed every 15 minutes. In the invention system, there is a full backup performed every 24 hours, an incremental backup performed every 15 minutes, and a differential backup performed every 8 hours and 45 minutes. Finally, for both systems assume that the size of the database is 5 GB and the database is changing at a rate of 3%.

Recovery to State at 50$^{th}$ Incremental Backup

In the existing system, if recovery of the database at the state when the 50$^{th}$ incremental backup was taken is requested, then one full backup plus 50 incremental backups are required to recover the database. The time to recover the database using the aforementioned fifty-one backups is 78 minutes. In contrast, using the invention system, one full backup, one differential backup, and fifteen incremental backups are required to recover the database. The time to recover the database using the aforementioned seventeen backups is 57 minutes. Accordingly, to recover the database to the state at the 50$^{th}$ incremental backup, the invention system requires 66.67% fewer backups to be transferred from the backup storage and 26.92% less time to complete the recovery process.

Recovery to State at 96$^{th}$ Incremental Backup

In the existing system, if recovery of the database at the state when the 96$^{th}$ incremental backup was taken is requested, then one full backup plus 96 incremental backups are required to recover the database. The time to recover the database using the aforementioned ninety-seven backups is 127 minutes. In contrast, using the invention system, one full backup, one differential backup, and twenty six incremental backups are required to recover the database. The time to recover the database using the aforementioned twenty-eight backups is 81 minutes. Accordingly, to recover the database to the state at the 96$^{th}$ incremental backup, the invention system requires 71.13% fewer backups to be transferred from the backup storage and 36.22% less time to complete the recovery process.

While the size of the database for both systems is assumed to be 5 GB, those skilled in the art may appreciate that the time reduced from implementing the invention system over the existing system may vary according to the size of the database.

End of Example 2

By reducing the number of backups used to perform a recovery, embodiments of the invention reduce the time required to recover the data. Further, by reducing the number of transactions from a backup storage device and a host, embodiments of the invention reduce the likelihood of a failure during a recovery process. Specifically, as the number of transactions (i.e., backups sent to the host) increases, the likelihood of failure increases because any one failure of a backup in a recovery process may cause the entire recovery process to fail.

Thus, embodiments of the invention may address the problem of inefficient use of computing resources. This problem arises due to the technological nature of the environment in which backups are stored remotely from the hosts.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing backups, the method comprising:

generating a full backup of a database;

after generating the full backup:

generating N incremental backups of the database, wherein N is a positive integer;

generating a first differential backup of the database after the N incremental backups have been generated, wherein the first differential backup is generated relative to the full backup;

generating M incremental backups of the database after generating the first differential backup, wherein M is a positive integer;

after generating the M incremental backups of the database, generating a second differential backup of the database, wherein the second differential backup is generated relative to the full backup, wherein the full backup, the N incremental backups, the first differential backup, the M incremental backups, and the second differential backup are stored on a backup storage device;

after generating the M incremental backups:

receiving a request to recover the database to a specified point in time;

obtaining the full backup from the backup storage device;

making a first determination that the first differential backup is required to recover the database to the specified point in time;

based on the first determination, obtaining the first differential backup from the backup storage device;

making a second determination that at least one of the M incremental backups are required to recover the database to the specified point in time;

making a third determination that the second differential backup and the N incremental backups are not required to recover the database to the specified point in time;

based on the second and third determinations, obtaining the at least one of the M incremental backups from the backup storage device;

recovering the database to the specified point in time using the full backup, the first differential backup and the at least one of the M incremental backups, wherein the first differential backup is dependent on the full backup, wherein each of the N incremental backups is dependent on a previous most recent backup, wherein the previous most recent backup is one of: the full backup, the first differential backup, and one of the N incremental backups.

2. The method of claim 1, wherein the specified point in time is denoted by a first timestamp, and wherein making the first determination comprises using the first timestamp and a second timestamp associated with the first incremental backup.

3. The method of claim 1, wherein N=M.

4. A system, comprising:
a processor;
a database;
memory comprising instructions which when executed by the processor perform a method, the method comprising:
- generating a full backup of a database; and
- after generating the full backup:
  - generating N incremental backups of the database;
  - generating a first differential backup of the database after the N incremental backups have been generated, wherein the first differential backup is generated relative to the full backup;
  - generating M incremental backups of the database after generating the first differential backup, wherein M is a positive integer;
    - after generating the M incremental backups of the database, generating a second differential backup of the database,
  - wherein the second differential backup is generated relative to the full backup,
  - wherein the full backup, the N incremental backups, the first differential backup, the M incremental backups, and the second differential backup are stored on a backup storage device;
- after generating the M incremental backups:
  - receiving a request to recover the database to a specified point in time;
  - obtaining the full backup from the backup storage device;
  - making a first determination that the first differential backup is required to recover the database to the specified point in time;
  - based on the first determination, obtaining the first differential backup from the backup storage device;
  - making a second determination that at least one of the M incremental backups are required to recover the database to the specified point in time;
  - making a third determination that the second differential backup and the N incremental backups are not required to recover the database to the specified point in time;
  - based on the second and third determinations, obtaining the at least one of the M incremental backups from the backup storage device;
  - recovering the database to the specified point in time using the full backup, the first differential backup and the at least one of the M incremental backups,
- wherein the first differential backup is dependent on the full backup,
- wherein each of the N incremental backups is dependent on a previous most recent backup,
  - wherein the previous most recent backup is one of: the full backup, the first differential backup, and one of the N incremental backups.

5. The system of claim 1, wherein the specified point in time is denoted by a first timestamp, wherein making the first determination comprises using the first timestamp and a second timestamp associated with the first incremental backup.

6. The system of claim 4, wherein N=M.

7. A non-transitory computer readable medium comprising computer readable program code, which when executed by a computer processor enables the computer processor to perform a method for managing backups, the method comprising:
- generating a full backup of a database;
- after generating the full backup:
  - generating N incremental backups of the database, wherein N is a positive integer;
  - generating a first differential backup of the database after the N incremental backups have been generated, wherein the first differential backup is generated relative to the full backup;
  - generating M incremental backups of the database after generating the first differential backup, wherein M is a positive integer;
  - after generating the M incremental backups of the database, generating a second differential backup of the database, wherein the second differential backup is generated relative to the full backup,
- wherein the full backup, the N incremental backups, the first differential backup, the M incremental backups, and the second differential backup are stored on a backup storage device;
- after generating the M incremental backups:
  - receiving a request to recover the database to a specified point in time;
  - obtaining the full backup from the backup storage device;
  - making a first determination that the first differential backup is required to recover the database to the specified point in time;
  - based on the first determination, obtaining the first differential backup from the backup storage device;
  - making a second determination that at least one of the M incremental backups are required to recover the database to the specified point in time;
  - making a third determination that the second differential backup and the N incremental backups are not required to recover the database to the specified point in time;
  - based on the second and third determinations, obtaining the at least one of the M incremental backups from the backup storage device;
  - recovering the database to the specified point in time using the full backup, the first differential backup and the at least one of the M incremental backups,
- wherein the first differential backup is dependent on the full backup,
- wherein each of the N incremental backups is dependent on a previous most recent backup,
  - wherein the previous most recent backup is one of: the full backup, the first differential backup, and one of the N incremental backups.

8. The non-transitory computer readable medium of claim 7, wherein the specified point in time is denoted by a first timestamp, and wherein making the first determination comprises using the first timestamp and a second timestamp associated with the first incremental backup.

* * * * *